Dec. 15, 1964 J. L. COLLINS 3,161,730

ULTRA-LOW FREQUENCY RECORDING

Filed Nov. 9, 1960 2 Sheets-Sheet 1

INVENTOR.
JOSEPH L. COLLINS
BY W. O. Quesenberry
D. Hodges
ATTYS.

INVENTOR.
JOSEPH L. COLLINS
BY W. O. Quesenberry
O. P. Hodges
ATTYS.

United States Patent Office 3,161,730 Patented Dec. 15, 1964

3,161,730

ULTRA-LOW FREQUENCY RECORDING

Joseph L. Collins, Austin, Tex., assignor, by mesne assignments, to the United States of America as represented by the Secretary of the Navy Filed Nov. 9, 1960, Ser. No. 68,320
5 Claims. (Cl. 179—100.2)

This invention relates to recording signals and more particularly to recording ultra-low frequency signals.

Previously, recording of ultra-low frequency signals, i.e. signals of frequency between zero and one cycle per second, was accomplished by employing vacuum tube or transistor modulators. These components proved unsatisfactory because of the drift associated therewith. Drift cannot be tolerated on ultra-low frequency signals because it affects resultant output signal amplitude in such a manner as to render the actual signal indistinguishable.

The effect of drift is even more greatly emphasized when two ultra-low frequency signals of approximately the same magnitude are to be recorded and compared when they are played back. If any drift is introduced into the system when such data is being recorded, virtually no information will be obtained after the comparison is made.

The prior art devices frequently require large power supplies which are not suitable for portable uses over long periods of time. Also, transistors and tubes are not satisfactory because they change their characteristics with temperature and time resulting in variations of output signal that are unpredictable. Many of the prior devices failed to perform over long periods of time because they were not sufficiently rugged for many applications.

Accordingly, it is an object of this invention is to provide a new and improved system for recording ultra-low frequency signals.

Another object of this invention is to provide an ultra-low frequency recording system that is not subject to drift.

A further object of this invention is to provide a new and improved system and method for recording ultra-low frequency signals and comparing these signals when they are played back.

An additional object of this invention is to provide a new and improved system and method for recording and comparing ultra-low frequency signals so that drift will not be introduced into the compared signals.

Still other objects of this invention are to provide a recording system that does not require a great amount of power; may be used for long periods of time; will not be subject to variations in the characteristics of the essential elements; and will be dependable and sufficiently rugged for most applications.

Various other objects and advantages will appear from the following description of one embodiment of the invention, and the novel features will be particularly pointed out hereinafter in connection with the appended claims.

Figure 1:
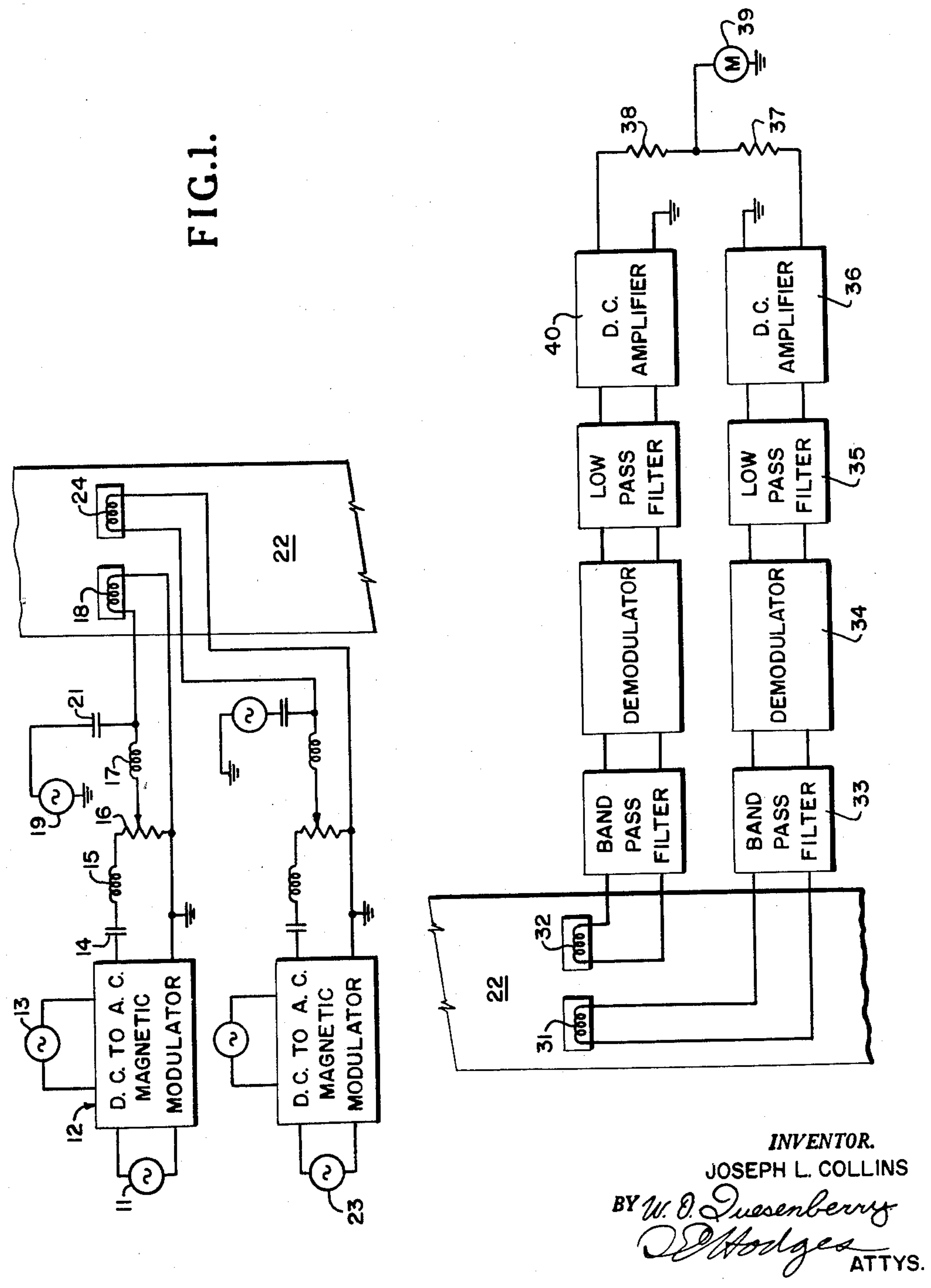
Figure 2:
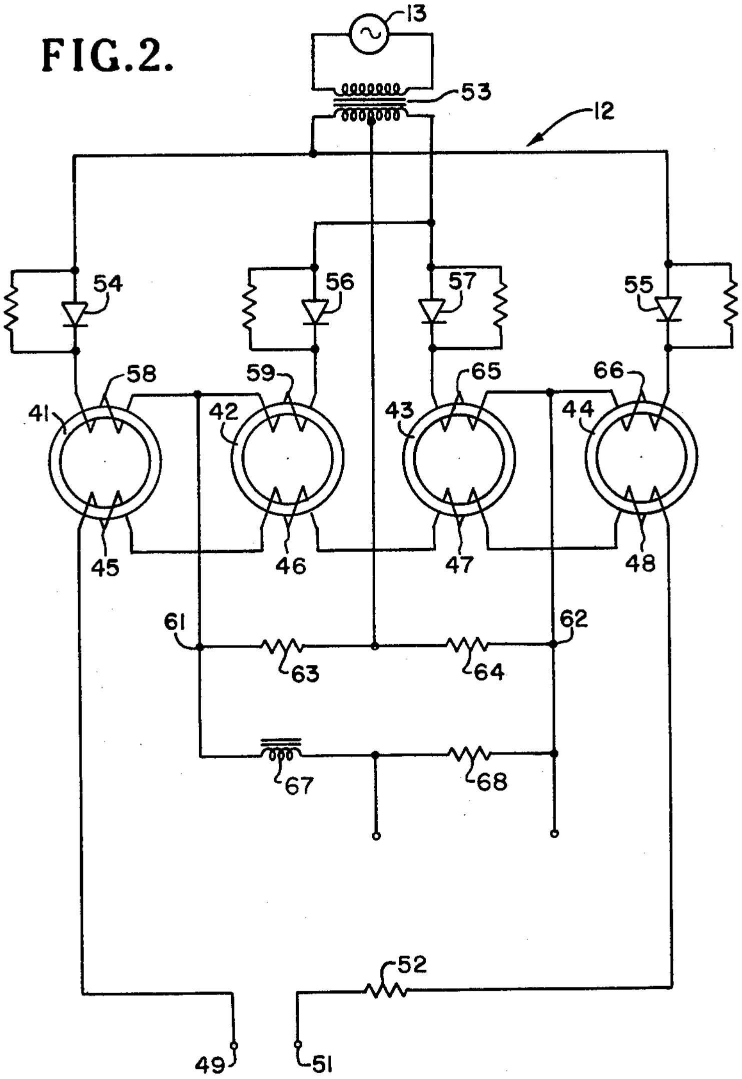

The manner in which this invention achieves these objects can best be understood by reference to the accompanying drawings in which:

FIG. 1 is a block diagram of an entire record and playback system suitable for use with the present invention; and FIG. 2 is a schematic diagram of the magnetic modulator employed in the system of FIG. 1.

It is to be understood that like reference numerals designate like or corresponding parts throughout the several views of the drawings.

Referring now to FIG. 1 of the drawings a block diagram of the entire ultra-low frequency recording and playback system is illustrated. An ultra-low frequency signal source 11, i.e. a source having a frequency equal to or less than one cycle per second, is connected to the input terminals of sinusoidal magnetic modulator 12 to which is also coupled a suitable power supply 13 having a frequency considerably in excess of the frequency of the signal generated by source 11, preferably 400 cycles per second. The output of modulator 12 is a modulated sinusoidal signal having a carrier repetition rate equal to that of supply 13 and an instantaneous envelope amplitude commensurate with the amplitude of signal source 11.

The output terminals of modulator 12 are connected to a filter and voltage divider containing capacitor 14 which is series connected to coil 15 and potentiometer 16. This filter permits the maximum amplitude signal equal to the supply voltage to be coupled to the slider of potentiometer 16 and eliminates any harmonics that might be introduced by the modulator. The slider of potentiometer 16 is connected to a standard magnetic recording head 18 by way of choke 17, and is adjusted so that the head will be properly magnitized for the expected amplitude range of the applied signals. A bias supply 19 of frequency considerably greater than that of supply source 13, preferably 70 kilocycles per second, is coupled to recording head 18 through coupling capacitor 21 and prepares head 18 and magnetic tape 22 upon which the signals are induced to record the signal. Choke 17 is designed to prevent the high frequency bias supply signals from being fed to the modulator.

The apparatus associated with ultra-low frequency signal source 23 and recording head 24 is identical to that used to record the signals from source 11 by head 18 on tape 22 and consequently do not need to be fully described. Signal source 23 will generally be in phase with the signal generated by source 11 and consequently of the same frequency in order to obtain an intelligent comparison between them.

The signals recorded by heads 18 and 24 on tape 22 will be applied to separate channels on tape 22. When the signals are applied and later played back, the tape is driven by constant speed motor or motors as well known in the art.

When the tape is played back, the signal stored thereon applied by head 18 is detected by pick up head 31 while the signal applied by head 24 is picked up by head 32. The output of head 31 is coupled to a conventional band pass filter 33 that feeds a signal of frequency equal to that of source 13 and amplitude commensurate with signal source 11 to a standard demodulator 34, preferably of the ring or bridge type. The D.C. output of demodulator 34 is coupled to low pass filter or smoothing circuit 35 providing an input to D.C. amplifier 36. The input to amplifier 36 is a faithful reproduction of the signal originally generated by signal source 11. D.C. amplifier 36 is a conventional component that may be either of the electronic or magnetic variety. The output of amplifier 36 is supplied between resistor 37 and a common or ground potential.

The signal detected by pickup head 32 is supplied to resistor 38 by way of apparatus identical to that used in amplifying and demodulating the signal induced in head 31. The output of amplifier 40 is supplied between resistor 38 and ground.

The outputs of amplifiers 36 and 40 are compared by a conventional subtracting circuit, the result being read on meter 39. If vacuum tube amplifiers are employed, the output voltage of one amplifier will be of opposite polarity to that of the other amplifier and meter 39 will of the voltmeter variety. On the other hand, if amplifiers 36 and 40 are magnetic amplifiers, an ammeter will be connected between resistors 37 and 38 thus giving an indication of the difference between the signal amplitudes recorded on magnetic tape 22.

Due to the nature of ultra-low frequency signals and the magnetic recording apparatus, it is essential that modulator outputs contain a true sinusoidal carrier for the modulation signals. This is contrary to the normal magnetic modulator that produces a mutilated carrier output signal because the voltage across the cores drops almost to zero when they become saturated in response to the control voltage and the power supply.

Accordingly, the magnetic modulator illustrated in FIG. 2 has been developed to produce a sinusoidal carrier voltage modulated by the low frequency signals of source 11 or 23.

The magnetic modulator contains four magnetic cores 41, 42, 43, and 44, preferably having substantially rectangular hysteresis loops. Each of the cores has a separate control and power winding wound thereon.

The control windings 45, 46, 47, and 48 of the respective cores are series connected between control terminal 49 and one end of current limiting resistor 52, the other end of resistor 52 being connected to the other control terminal 51. Ultra-low frequency signal source 11 or 23 is connected between terminals 49 and 51. The control windings are arranged so that a positive signal at terminal 49 will tend to set cores 41 and 42 towards positive saturation, while cores 43 and 44 will be set towards negative saturation by such a signal.

The power windings on cores 41 and 44, are connected to one end of the secondary winding associated with power transformer 53 through diodes 54 and 55, respectively, while the power windings on cores 42 and 43 are connected to the other end of the secondary winding related to the power transformer by the way of diodes 56 and 57. The primary winding of transformer 53 is connected across the carrier supply 13.

One terminal 61 of the output circuit is connected between the power windings 58 and 59 of cores 41 and 42, respectively and the other output circuit terminal 62 is connected between the power windings 65 and 66 of cores 43 and 44. A pair of load resistors 63 and 64 are series connected between terminals 61 and 62 and the junction point between them is connected to the center tap on the secondary winding of transformer 53. An integrating or smoothing circuit containing an inductor 67 having a permalloy dust core connected in series with resistor 68 is coupled across terminals 61 and 62. The modulated output signal is taken across the terminals of resistor 66 and is fed to one of the recording heads 18 or 24.

The power windings 58 and 66 are arranged so that when current is flowing through diodes 54 and 55 from anode to cathode, cores 41 and 44 will have a tendency to be set towards positive saturation while the power windings 59 and 65 are wound so that current flow through diodes 56 and 57 from anode to cathode will tend to set cores 42 and 43 towards negative saturation. During one half of the power cycle, current will flow from the left end of the secondary winding on transformer 53 as viewed in the drawing, through diode 54, winding 58, resistor 63 and back to the center tap and through diode 55, winding 66 and resistor 64 back to the center tap. During this half cycle any substantial current through windings 59 and 65 will be blocked by diodes 56 and 57, since the anodes thereof are connected to the negative end with respect to the center tap of the secondary winding of transformer 53. When the other half cycle of the power signal is occuring, windings 59 and 65 will be conducting and substantially no current will flow through windings 58 and 66. The stabilizing resistors connected in parallel with the diodes are designed to pass considerably less current than the diodes when they are in the conducting state.

The operation of this modulator will now be described in brief. If a positive signal is applied to terminal 49 the cores will be set towards saturation in the manner previously stated, i.e. cores 41 and 42 toward positive saturation and cores 43 and 44 towards negative saturation. During the portion of the power cycle when the left side of the transformer is positive, cores 41 and 44 will be driven towards positive saturation. Saturation of core 41 occurs prior to saturation of core 44 because of the setting caused by the control signal, resulting in greater current flow through resistor 63 than through resistor 64 for this half cycle and a positive voltage at terminal 61 with respect to terminal 62.

During the other portion of the power cycle when the right hand end of the transformer 53 is positive, cores 42 and 43 will be driven towards negative saturation. Saturation of core 43 occurs before saturation of core 42, causing greater current flow through resistor 64 than through resistor 63 for this half cycle and a positive voltage at terminal 62.

Thus the voltage across terminals 61 and 62 oscillates back and forth in response to the power or carrier source. The voltage between these terminals is integrated or smoothed by the resistor 68 and inductor 67 resulting in almost a pure sinusoidal output having an envelope magnitude indicative of the voltage across terminals 49 and 51. The elements of the filter circuit and the recording head further assist in the smoothing process resulting in the application of virtually a pure sinusoid to the magnetic tape 22.

For a more complete description of the manner in which the magnetic modulators function, reference should be made to the application of William A. Geyger for "Double-Integrator Circuit" filed on even date with this application, and bearing Seraial Number 68,317. Of course it is to be understood that any other suitable sinusoidal magnetic modulator that may be developed could be used and that the disclosure of the magnetic modulator of FIG. 2 is merely for purposes of example.

It should now be apparent that there has herein been disclosed a magnetically recording system and method for ultra-low frequency signals which will not be subject to drift, will function properly over long periods of time without burning out or changing characteristics and can be used to record and compare a pair of signals having amplitudes within operating limits of the device.

It will be understood that various changes in the details, materials, steps and arrangements of parts, which have been herein described and illustrated in order to describe the nature of the invention, may be made by those skilled in the art within the principle and scope of the invention as expressed in the appended claims.

What is claimed as new and desired to be secured by Letters Patent of the United States is:

1. Apparatus for comparing a pair of ultra-low frequency signals comprising a magnetic recorder system including first and second recording channels and respective first and second playback channels, each of said recording channels including a sinusoidal magnetic modulator having a control circuit and a load circuit, an ultra-low frequency signal source, means connecting said ultra-low frequency signal source to said control circuit, a recording head, integrator means connecting the load circuit of said magnetic modulator to said recording head, a high frequency voltage source, means connecting said high frequency voltage source to said recording head, each of said first and second playback channels comprising a playback head, a band pass amplifier, demodulator, and a low pass filter serially interconnected between said playback head and a D.C. amplifier, first means connecting the D.C. amplifier of the first playback channel to an indicator, second means connecting the D.C. amplifier of the second playback channel to said indicating means.

2. Apparatus for comparing a pair of ultra-low frequency signals comprising a magnetic recorder system including first and second recording channels each having respective record and playback heads, a first sinusoidal magnetic modulator for coupling one of the signals to the record head of said first channel, said first sinusoidal modulator having an input circuit and an output circuit, means connecting one of said signals to the input circuit of said first sinusoidal magnetic modulator, first integrator means connecting the output circuit of said first sinusoidal magnetic modulator to the record head of said first channel, a second sinusoidal magnetic modulator for coupling the other signal to the record head of said second channel, said second sinusoidal modulator having an input circuit and an output circuit, means connecting the other of said signals to the input circuit of said second sinusoidal magnetic modulator, second integrator means connecting the output circuit of said second sinusoidal magnetic modulator to the record head of said second channel, a first demodulator coupled to the playback head of said first recording channel, a second demodulator coupled to the playback head of said second recording head, and means coupled to said first and second demodulators for comparing the outputs thereof.

3. The apparatus of claim 2 further including a pair of band pass filters, each coupled between a respective one of said playback heads and a respective one of said demodulators, and a pair of low pass filters, each coupled between a respective one of said demodulators and said comparing means.

4. The apparatus of claim 3 wherein each of said comparing means includes a pair of D.C. magnetic amplifiers, each connected to a respective one of said low pass filters, a pair of resistors each coupled to a respective one of said amplifiers, and a meter coupled to said pair of resistors.

5. Magnetic tape recording and playback apparatus comprising a first recording channel, a second recording channel, a first playback channel and a second playback channel, said first recording channel comprising a first recording head, a first sinusoidal magnetic modulator having a control circuit and a load circuit, a first ultra-low frequency signal source connected to the control circuit of said first sinusoidal magnetic modulator, a first integrator circuit connected to the load circuit of said first sinusoidal magnetic modulator, said first recording head being connected to said first integrator, a high frequency voltage source connected to said first recording head, said second recording channels comprising a second recording head, a second sinusoidal magnetic modulator having a control circuit and a load circuit, a second ultra-low frequency signal source connected to the control circuit of said second sinusoidal magnetic modulator, a second integrator circuit connected to the load circuit of said second sinusoidal magnetic modulator, said second recording head connected to said second integrator circuit, a second high frequency voltage source connected to said second recording head, said first playback channel comprising a first playback head, a first demodulator, means connecting said playback head to said first demodulator, a first amplifier, means connecting said first demodulator to said first amplifier, an output indicator circuit, means connecting said first amplifier to said output indicator circuit, said second playback channel comprising a second playback head, a second demodulator, means connecting said second playback head to said second demodulator, a second amplifier, means connecting said second demodulator to said second amplifier, means connecting said second amplifier to said output indicator circuit whereby a comparison between said first and second ultra-low frequency signals may be made.

References Cited by the Examiner

UNITED STATES PATENTS

| | | | |
|---|---|---|---|
| 2,497,654 | 2/50 | Begun | 179—100.2 |
| 2,629,784 | 2/63 | Daniels | 179—100.2 |

IRVING L. SRAGOW, *Primary Examiner.*

NEWTON N. LOVEWELL, *Examiner.*